April 26, 1955     M. H. CORLEY ET AL     2,707,046
CONVEYOR FOR WRAPPING MACHINE
Original Filed March 7, 1949     4 Sheets-Sheet 3
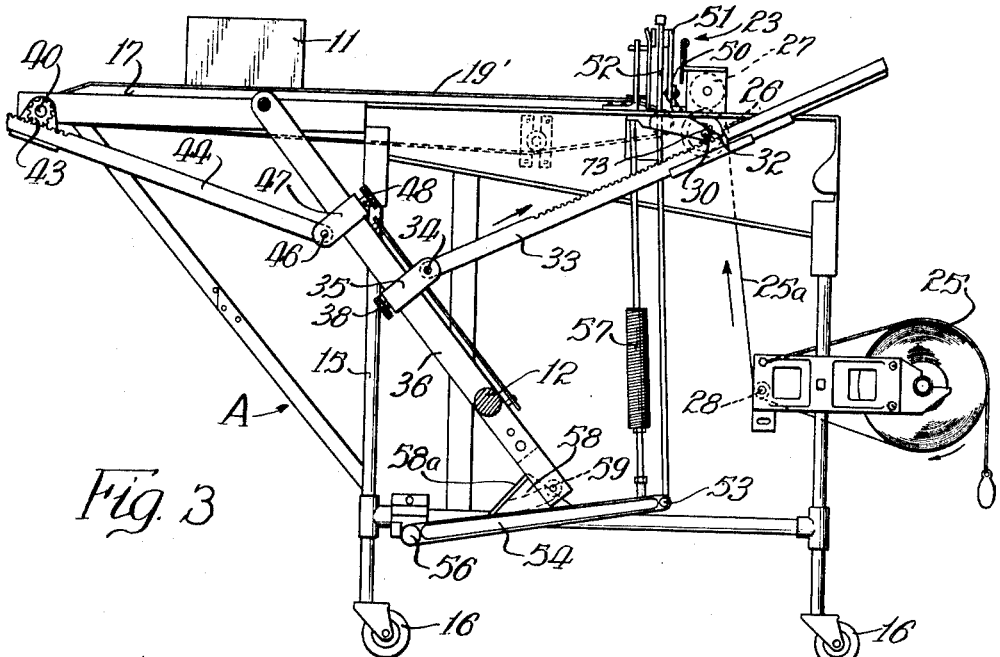
Fig. 3
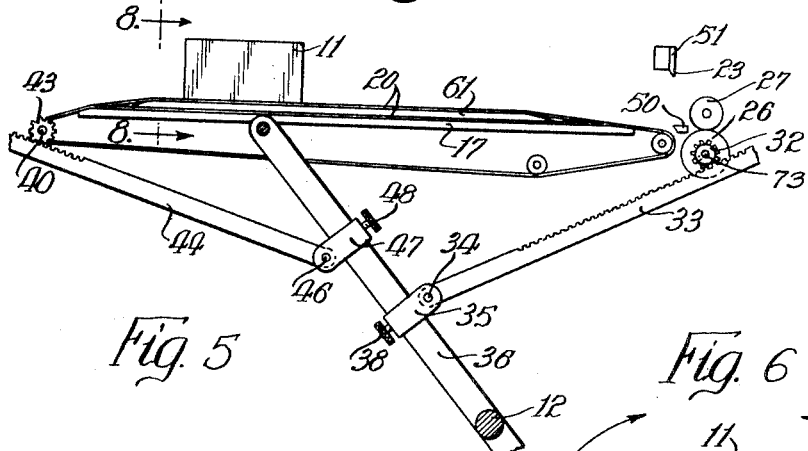
Fig. 5     Fig. 6
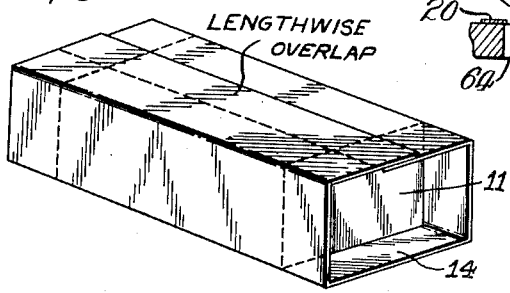
Fig. 7
LENGTHWISE OVERLAP
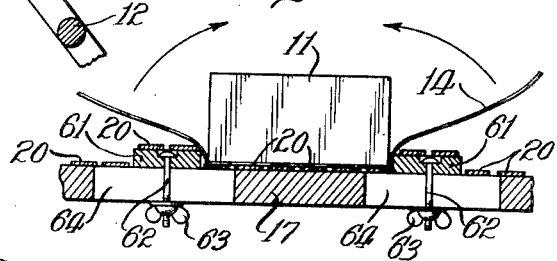
INVENTORS.
Mark H. Corley
BY Bengt A. Arvidson
Ralph F. Barber
Schroeder, Merriam,
Hofgren and Brady, Attys.

April 26, 1955
M. H. CORLEY ET AL
2,707,046
CONVEYOR FOR WRAPPING MACHINE
Original Filed March 7, 1949
4 Sheets-Sheet 4
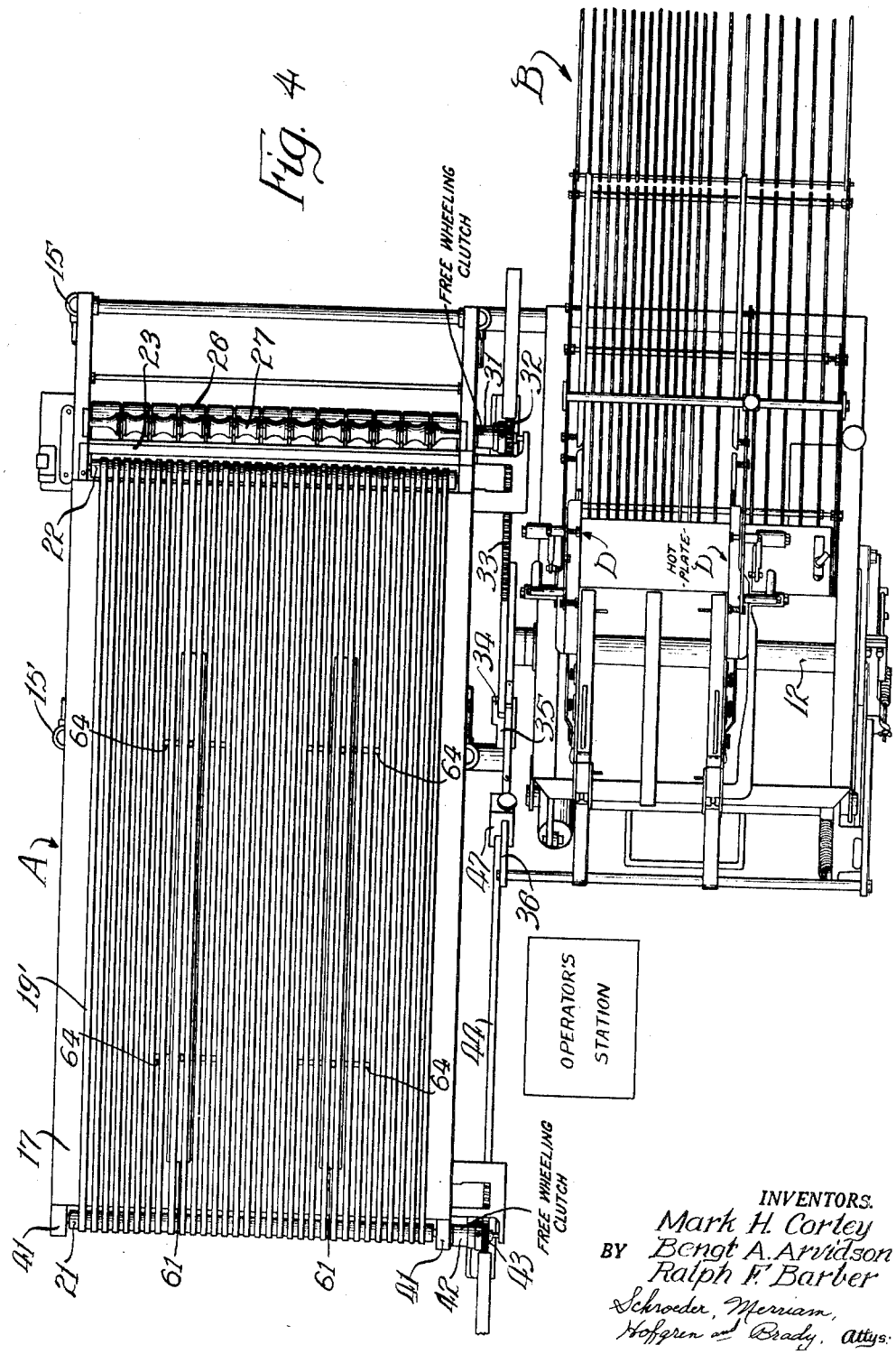
INVENTORS.
Mark H. Corley
BY Bengt A. Arvidson
Ralph F. Barber
Schroeder, Merriam,
Hofgren and Brady, Attys.

United States Patent Office 2,707,046
Patented Apr. 26, 1955

2,707,046

CONVEYOR FOR WRAPPING MACHINE

Mark H. Corley, River Forest, Bengt A. Arvidson, Villa Park, and Ralph F. Barber, Elmhurst, Ill., assignors to Miller Wrapping & Sealing Machine Co., Chicago, Ill., a corporation of Illinois Original application March 7, 1949, Serial No. 79,956. Divided and this application December 8, 1951, Serial No. 261,263

4 Claims. (Cl. 198—190)

This invention relates to packaging machinery and pertains more especially to wrapping and sealing machines of the semi-automatic type, and to sheeters designed for use with machines of that character, as well as separately.

This case is a division of our application filed March 7, 1949, under Serial No. 79,956, now Patent No. 2,654,196.

The species of wrapping and sealing machines with which this application is more particularly concerned is one extensively employed in the wrapping of articles such as bread and other bakery products—being well suited to such purpose because of its quick and easy adaptability to the wrapping and sealing of packages of diverse sizes and proportions. But the utility of the present machine is not in any sense limited or largely confined to the bakery trade. On the contrary, certain of the major features of this invention are more concerned with the packaging of products such as butter, ice cream and the like, which cannot, without injury, be subjected to prolonged high temperatures, while still other features are concerned with special wrapping problems having to do, for example, with articles which are exceptionally thin, or extraordinarily bulgy, or of unusually light weight—characteristics rarely encountered in baked goods normally packaged by machines of the kind here dealt with.

A "sheeter," as that term is employed herein, is a piece of equipment which may be a separate and distinct entity or, alternatively, an integral part of the wrapping and sealing machine; the function of the sheeter is to cut wrapping material into pieces of identical size, each suitable for wrapping a particular article or unit group of articles, and operative to deliver the cut sheets, one at a time, to a point within easy reach of the operator, or to a predetermined position at which a step in the wrapping operation is to be performed. Such equipment can be and sometimes is utilized independently of a wrapping machine; but ordinarily it is not so employed; and in the typical embodiments of the invention herein described the sheeters are, in each instance, part and parcel of the wrapping machines themselves.

The machines hereinafter described are classified as "semi-automatic" because a part of the wrapping operation is performed by the operator, manually. This consists in placing an article-to-be-wrapped, or a prescribed quantity of material, as the case may be, on a sheet of wrapping material of appropriate size, folding the sheet around the article or material in the manner of a band, and then manually inverting the banded article and placing the same on the wrapping machine in position to be acted upon thereby. The above-described manual operation is known and referred to herein as the "banding operation"; and an article with a sheet of wrapping material banded therearound is referred to as a "banded article."

But the latter term ceases to be discriminative or appositive when the succeeding end-folding operations have been performed on the wrapper, and is not employed herein with reference to a package which has progressed beyond the initial banded stage.

The wrapping material most commonly used is moisture proof cellophane. Such a material is advantageous because superimposed layers can quickly be bonded together through mere application of heat. This makes it easy to hermetically seal all wrapper overlaps, thus rendering the packages moisture-tight; and the machines herein described are equipped to perform the heat-sealing operations, in addition to the folding operations at the two ends of each package. Moistureproof cellophane, however, is not the only wrapping material suitable for use with wrapping machines of the kind here dealt with; and at least one of the features of the subject invention pertains especially to a problem having to do exclusively with the use of non-heat-sealing wrapping material.

The object of the present invention is to expedite the manual portion of the wrapping operation; and to that end we have found that substantial time savings can be effected by providing, in conjunction with the belt conveyor of the sheeter, a trough-like arrangement which is effective to turn upwardly the sides or flies of the wrapper when an article-to-be-wrapped is deposited thereon at the banding position on the conveyor. This improvement enables the operator quickly, and without impediment, to place his hands underneath the two flies of the wrapper—which he must do in order to carry out the banding operation—and thus obviates the delay incident to any difficulty the operator might otherwise experience in that respect. Maximum output per machine is inherently dependent upon performance of the multitudinous banding operations with the utmost dispatch; and it follows, as a matter of course, that oft-repeated delays caused by the wrappers lying flat are soon evidenced in noticeably diminished output. The organization which has been found most effective in this connection includes a belt conveyor comprising numerous laterally spaced, narrow, flexible belts in combination with a pair of strips or cleats located immediately below the upper span of the conveyor and adapted to be adjustably spaced apart laterally of the conveyor in conformity with the length of the article-to-be-wrapped—the spacing between the strips being, in each instance, sufficient to admit one such article at a time therebetween. When an article is deposited on a wrapper lying on the conveyor at the banding position, it is so placed by the operator that it will descend by gravity into the space between the aforementioned strips, and the ensuing downward movement of the article, abetted by the action of the strips, causes the flies of the wrapper to be deflected upwardly.

In the drawings which accompany this specification:

Fig. 3 is an elevational view of a sheeter, including a modified belt conveyor which differs from that shown in Fig. 1; and includes a drive arm which forms a constituent part of the wrapping and sealing machine per se;

Fig. 4 is a plan view of a wrapping and sealing machine, together with a sheeter in accordance with Fig. 3;

Fig. 5 is a fragmentary elevational view, similar to Fig. 3, depicting the use of a pair of belt supporting and elevating strips or cleats associated with the sheeter conveyor and serving to form a trough at the banding position for centering articles-to-be-wrapped and for deflecting upwardly the flies of each successive wrapper;

Fig. 6 is an enlarged sectional view, taken at line 6—6 of Fig. 5; and

Fig. 7 is an isometric view of a rectangular article with a wrapper of cellophane or other sheet material banded therearound, illustrating the manually-performed banding operation.

*General description*

Figure 1:
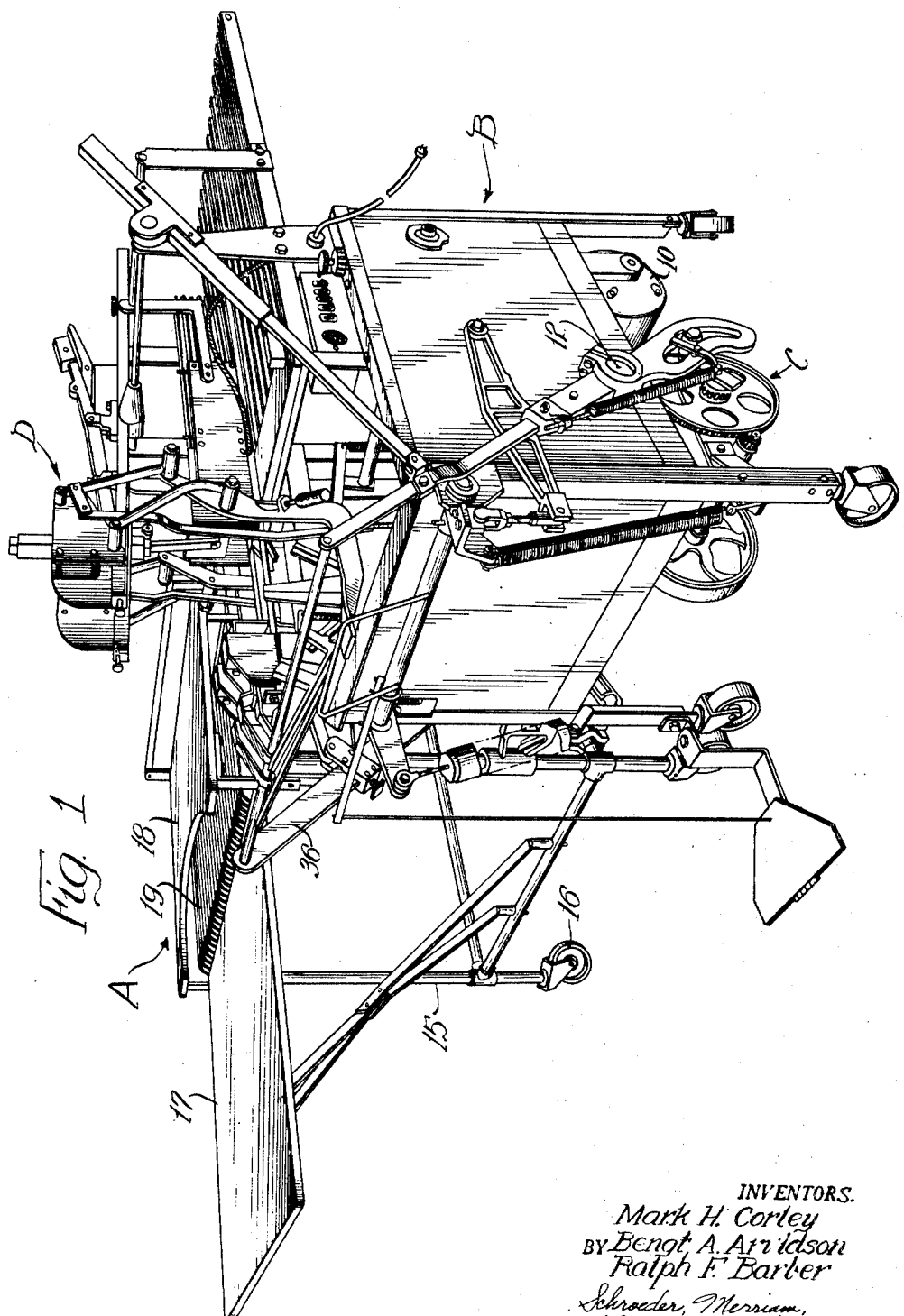
Figure 1 is a perspective view of a complete wrapping and sealing machine, including a sheeter, and it exhibits some but not all of the features of novelty which are dealt with in this specification.

The assemblage shown perspectively in Fig. 1 comprises what may be regarded as two distinct machines capable of separate and independent operation, but mechanically interconnected and co-ordinated to operate in predetermined timed relation, thereby constituting, in effect, a single machine. One major part of the assemblage is known as a "sheeter" or "sheeting machine" and is identified as a whole by the reference letter "A," while the other major part is known as a "wrapping and sealing machine" or, more briefly, as a "wrapping machine," and is identified as a whole by the reference letter "B." The machine is semi-automatic, as distinguished from fully-automatic, in that one step in the wrapping operation is performed manually by the operator of the machine. Being semi-automatic, it is less costly to build than a comparable fully automatic machine, and better adapted for quick change-overs to accommodate variously sized articles; and for that reason it is more economical than a fully automatic machine where certain conditions prevail which render fully-automatic operation unwarranted. This is especially true when the machine is to be employed for wrapping articles of various shapes and sizes, and where the required output of any one article is not large enough to keep a fully-automatic machine in more or less continuous operation for relatively long periods.

The function of the sheeter A is to feed out and cut off sheets of wrapping material of predetermined size, suited to the article to be wrapped, and to deliver the same to a position within convenient reach of the operator. The two machines, that is to say the sheeter and wrapping machine, are so co-ordinated that a single sheet of wrapping material is cut off and delivered to the operator preliminarily to the commencement of each cycle of operation of the wrapping machine. The wrapping material usually is moisture proof, susceptible of being heat-sealed; but the machine is adaptable for use with non-heat-sealing cellophane or with wrapping paper of other kinds.

The first step in the wrapping operation (referred to herein as the "banding" operation) is a manual one in that the operator picks up an article to be wrapped, places the same on a sheet of wrapping material and folds the sheet around the article, and then picks up the article, together with the sheet of wrapping material folded or banded therearound, and turns the same upside down and places it in position on the track of the wrapping machine. The wrapping machine, and likewise the sheeter, are at rest when the partially wrapped or banded article is put in place thereon. At this point two sets of stationary fingers forming component parts of the wrapping machine perform the initial end-folding operation purely as a result of the banded article being placed on the wrapping machine track.

As soon as a banded article has been positioned on the wrapping machine track, the operator trips the clutch-control mechanism by means of a foot-operated treadle or hand lever, thereby causing the entire machine, including the sheeter, to be power driven through one complete cycle of operation; whereupon, the wrapping machine functions to complete the folding operations on the two ends of the package, and also performs the necessary heat-sealing operations, while at the same time the sheeter cuts off and pays out another sheet of wrapping material preparatory to the succeeding cycle of operations.

The power for operating the sheeter, as well as the wrapping machine, is provided by an electric motor 10 which is mounted on the wrapping machine and connected through certain transmission means C, later to be described, to a rocker shaft 12 forming an integral part of the wrapping machine but serving as a common drive-shaft for both the wrapping machine and the sheeter.

*The sheeter and novel features appertaining thereto*

The sheeter A comprises a frame 15 of tubular construction, equipped, preferably, with casters 16, and has a table 17 on which each successive sheet of wrapping material 14 (see Fig. 6) is placed preliminarily to the first step in the wrapping operation. This first step is known as the "banding" operation and consists in placing the article 11 to be wrapped (see Fig. 3) on the sheet of wrapping material 14, suitably centered, and then manually folding the sheet 14 around the article 11, as clearly illustrated in Fig. 7.

The sheeter depicted in Fig. 1 includes a second table 18 on which articles to be wrapped may be stored for the convenience of the operator. Immediately below this table is a belt conveyor 19 onto which the sheets of wrapping material are delivered from the cutting-off shear, one at a time, and from which the sheets are transferred manually to the sheeter table 17.

Figure 2:
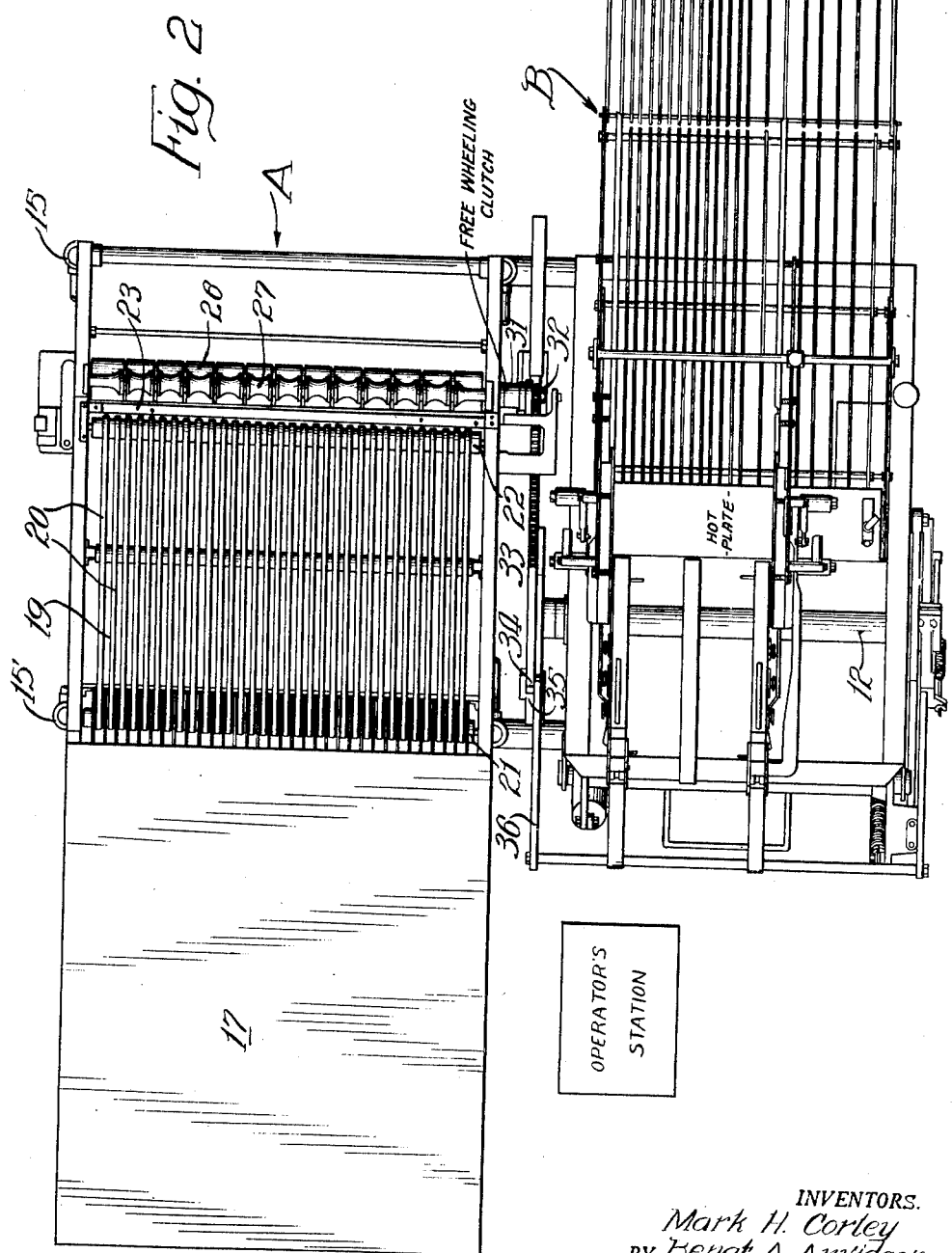
Fig. 2 is a plan view of the wrapping and sealing machine and sheeter of Fig. 1, but from which various details have been omitted in the interest of simplicity and clarity, the omitted details being sufficiently shown in other views.

In the plan view of Fig. 2 the article table 18 has been omitted in order to show more clearly the belt conveyor 19 which, as will be seen, comprises a considerable number of narrow, laterally spaced parallel belts 20 passing around rollers 21 and 22, one of which is driven intermittently for the purpose of causing the conveyor belts to advance a predetermined distance and thereby effect transfer of a cut-off sheet of wrapping material from the output side of a power-driven cutting-off shear 23 to a position within reach of the operator who stands or sits at the location labeled "Operators Station" in Fig. 2. A roll 25 of sheet wrapping material, such as cellophane (see Fig. 3) is mounted on the sheeter frame; and the web of wrapping material is fed from this roll and between a pair of feed and pressure rollers 26 and 27 into and through the gap of the shear 23 and thence onto the conveyor 19.

It may be mentioned at this point that the showing of a prior art sheeter in Figs. 1 and 2 serves a useful purpose in that it provides a basis for comparison in connection with the ensuing description of the sheeter improvements which we have effected.

In Figs. 3 and 4 there is illustrated a modification, in accordance with our invention, of the sheeter A of Figs. 1 and 2, together with a showing of the sheeter drive mechanism, which latter showing is applicable to both the prior art sheeter and the present improved sheeter. Here the frame of the sheeter is identified, as before, by the reference numeral 15. The major difference between the sheeter of Figs. 3 and 4 and that of Figs. 1 and 2 is that the belt conveyor 19' is extended lengthwise so that it is substantially co-terminous at the left-hand end with the corresponding end of the sheeter table 17—compare Figs. 2 and 4.

When using a well known sheeter, such as that of Figs. 1 and 2, the banding operation is performed on the table 17 and the operator must reach for and pull forwardly from the conveyor 19 a sheet of wrapping material and place the same at a convenient position before undertaking to perform the banding operation. But with the extended conveyor 19' of Figs. 3 and 4, each sheet of wrapping material can be moved by the conveyor to a position which has been determined in advance to be most convenient for the operator, thereby making it unnecessary for the operator to reach for a sheet preliminarily to each banding operation. This results in a very considerable saving of time and effort, and thus increases the potential output of each machine and operator.

Referring more particularly to Figs. 3 and 4, it will be seen that the web 25a of cellophane or other sheet wrapping material is drawn from the roll 25 and then passes around a guide roll 28 and thence upwardly and over a feed roller or group of feed rollers 26, above which, and in contact with the web 25a, is the pressure roller, or group of pressure rollers 27. The feed roller 26 is mounted on a shaft 30 to the near end of which is secured the driven portion of a free wheeling clutch 31 (see Fig. 2). The driving member of this clutch is provided with a pinion 32, concentric with the shaft 30 and continuously meshed with the teeth of a rack 33 one end of which is pivotally connected at 34 to a fitting 35 mounted on a rocker arm 36. The fitting 35 is adjustably movable lengthwise of the rocker arm 36, and may be secured in any position by means of a clamp screw 38. The rocker arm 36 is a part of the wrapping machine and is mounted on the rocker shaft 12 which also is a part of the wrapping machine. This rocker shaft is shown sectionally in Fig. 3.

The rocker arm 36 is oscillated by the rocker shaft 12 through an acute angle and is thus effective to reciprocate the rack 33. It is shown at one extremity of its travel. Each stroke of the rack 33 in the direction indicated by the arrow adjacent thereto in Fig. 3 is effective to rotate the feed roller 26 in the direction which will cause the web 25a of wrapping material to be fed a predetermined distance through the shear 23, thus positioning a predetermined length of the web on the belt conveyor 19', in readiness to be cut off by the shear 23. At the same time, the previously cut sheet of wrapping material is advanced by the conveyor 19' either to an intermediate position or to the banding position, at which there is shown (see Fig. 3) an article 11 of rectangular form—said article having been placed and centered by the operator on a sheet of wrapping material located at the banding position. Whether the sheet of wrapping material is advanced to the banding position in one or two or more steps is dependent upon the size of the sheet, and is determined by adjusting the travel of the conveyor belt, per step, as will presently be explained.

The roller 21 (Figs. 3 and 4) is secured to a shaft 40 journaled in bearing brackets 41, 41 attached to the end of the table 17; and the driven member of a free-wheeling clutch 42 is keyed to the shaft 40 and rotatable therewith. The driving member of this clutch is provided with a pinion 43 which may form a component part thereof and this pinion is meshed with the teeth of a rack 44 one end of which is pivotally connected at 46 to a fitting 47 which may be a replica of the fitting 35 previously described. The fitting 47 is slidably adjustable lengthwise of and carried by the rocker arm 36, and is equipped with a clamp screw 48 whereby it may be secured in any position of adjustment.

It will be clear that when the rocker arm 36 rotates clockwise, as viewed in Fig. 3, it moves the rack 44 in the direction which is effective to rotate the pinion 43 counterclockwise, thereby advancing the conveyor 19' a predetermined distance which is variable and in correspondence with the setting of the fitting 47 lengthwise of the rocker arm 36. During each return stroke of the rocker arm 36, the pinion 43 is rotated clockwise, together with the driving member of the clutch 42 (see Fig. 3) but the shaft 40 and roller 21 remain at rest because this clutch is effective only in one direction.

The shear 23 includes a stationary blade 50 and a vertically reciprocable blade 51 which is hinged at one end and connected at the other end to a vertical rod 52 the lower end of which is pivotally connected at 53 (see Fig. 3) to an arm 54 fulcrumed at 56 and biased upwardly by a coil spring 57. The arm 54 is provided with a cam 58 which is engaged by a cam roller 59 attached to the lower end of the rocker arm 36. When the rocker shaft 12 and the rocker arm 36 rotate in the counterclockwise direction, the roller 59 presses against the sloping surface 58a of the cam 58 and thus forces the arm 54 downwardly about the fulcrum 56 thereby actuating the movable shear blade 51. The shearing operation is thus performed while the web 25a is at rest, it being remembered that the feed roller 26 is not driven during the counterclockwise movements of the rocker arm 36 which is equally true as respects the conveyor driving roller 21 and its shaft 40.

When the shaft 12 and the rocker arm 36 are rotated clockwise, the roller 59 passes through a gated slot in the cam 58 and is consequently ineffective to depress the arm 46; hence, the shear remains at rest while the web of wrapping material is being advanced therethrough.

*The banding trough*

The novel feature to which this invention is directed is illustrated in Figs. 3, 4, 5 and 6, and is designed to expedite the manual banding operation portrayed in Fig. 7. As most clearly shown in Fig. 6, two strips or cleats 61 are secured to the top surface of the table 17 by means of bolts 62 provided with wing nuts 63; and the table is provided with transversely extending slots 64 through which these bolts extend. It will be apparent that by loosening the wing nuts 63, the strips or cleats 61 may independently be moved bodily crosswise of the table 17, thereby altering the lateral distance between them; and since the conveyor is made up of numerous narrow belts 20, a comparatively small lateral displacement of either one of the strips will result in adding or subtracting one of the belts 20 to or from the space between the strips. In Fig. 6 there is shown a group of fourteen belts 20 of which six are situated between the strips 61, four are located above these strips and superimposed thereon, and the remaining four are disposed at the outer sides of the strips. The conveyor shown has a total of thirty-two belts (see Fig. 4) only fourteen of which are shown in Fig. 6.

The strip adjustment thus depicted is sufficient to freely clear an article 11 which is shown in position between the strips 61 and resting on a sheet of wrapping material 14 cut to a prescribed length by the shear 23 and advanced by the conveyor to a convenient position immediately adjacent the operator's station, such as that indicated in Fig. 5. When the operator places an article 11 on a sheet of wrapping material 14, he positions it between the two strips 61, thereby pushing the sheet 14 down into the space between the two strips, and causing the free ends of the sheet to be deflected upwardly, as clearly illustrated in Fig. 6. The operator then is able quickly to place his hands under the elevated free ends of the sheet and flip these free ends over the article 11 into overlapped relation, as depicted in Fig. 7. This greatly expedites the manual banding operation by making it possible for the operator to place his hands underneath the sheet quickly and without interference. Obviously, the strips 61 can be moved closer together to accommodate articles of less width, or farther apart to accommodate articles of greater width.

We claim:

1. A sheeter including a belt conveyor comprising a plurality of parallel laterally spaced narrow endless belts and having a load-carrying span formed by said belts, and a pair of belt-supporting elements immediately underlying said span and adjustably separable laterally of said span, said elements being operative to flex upwardly any selected ones of a plurality of said belts, the upwardly flexed belts and the intervening belts forming, conjointly, a trough extending lengthwise of said span.

2. The combination in a sheeter, of a table having a table top disposed in a horizontal plane, a belt-conveyor comprising a plurality of laterally spaced parallel narrow belts and including a load-carrying span extending lengthwise of and overlying the top surface of said table top, and a pair of strips resting upon said top surface and projecting upwardly therefrom and spaced apart laterally of said load-carrying span, said strips extending lengthwise of said span, said strips being effective to flex upwardly from said top surface any selected ones of said belts under which they may be placed, at least one of said strips being adjustably movable laterally of said span, said strips and table top forming a trough extending lengthwise of said span, the belts intervening said strips being at the bottom of said trough.

3. A sheeter including a frame, means on the frame forming an endless belt conveyor, a portion of said belt conveyor forming a load-carrying span, and means on the frame and shiftable laterally of said span for elevating spaced preselected portions of said span, the arrangement being such that the portion of the span intermediate said elevated portions is disposed at a lower level, said elevated portions and said intermediate portion forming, conjointly, a trough of selectable width extending lengthwise of said span.

4. A sheeter including a frame, means on the frame forming an endless conveyor including a plurality of parallel laterally spaced narrow endless belts forming a load-carrying span, a pair of laterally spaced means for elevating laterally spaced belts, the arrangement being such that the portion of the span intermediate said elevated belts is disposed at a lower level, said elevated belts and said intermediate portion forming, conjointly, a trough extending lengthwise of said span.

References Cited in the file of this patent

UNITED STATES PATENTS 1,530,499   Knode _____ Mar. 24, 1925

FOREIGN PATENTS 415,769   Germany _____ July 4, 1925